(12) United States Patent
Lee et al.

(10) Patent No.: US 9,420,144 B2
(45) Date of Patent: Aug. 16, 2016

(54) IMAGE FORMING DEVICE TO PROVIDE PREVIEW IMAGE FOR EDITING MANUSCRIPT IMAGE, DISPLAY APPARATUS TO DISPLAY AND EDIT THE PREVIEW IMAGE, AND METHODS THEREOF

(71) Applicant: SAMSUNG Electronics Co., Ltd., Suwon-si, Gyeonggi-do (KR)

(72) Inventors: Hyung-ho Lee, Suwon-si (KR); Ki-tae Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/309,961

(22) Filed: Jun. 20, 2014

(65) Prior Publication Data

US 2015/0207957 A1    Jul. 23, 2015

(30) Foreign Application Priority Data

Jan. 20, 2014   (KR) .................. 10-2014-0006553

(51) Int. Cl.
| H04N 1/00 | (2006.01) |
| H04N 1/387 | (2006.01) |
| H04N 1/40 | (2006.01) |
| G06F 3/12 | (2006.01) |
| G06K 15/02 | (2006.01) |
| G06T 11/60 | (2006.01) |

(52) U.S. Cl.
CPC .......... *H04N 1/40093* (2013.01); *G06F 3/1208* (2013.01); *G06F 3/1256* (2013.01); *G06K 15/1882* (2013.01); *G06T 11/60* (2013.01); *H04N 1/0044* (2013.01); *H04N 1/00103* (2013.01); *H04N 1/00129* (2013.01); *H04N 1/00161* (2013.01); *H04N 1/00167* (2013.01); *H04N 1/3871* (2013.01); *G06T 2207/20092* (2013.01); *H04N 2201/006* (2013.01); *H04N 2201/0081* (2013.01); *H04N 2201/0089* (2013.01)

(58) Field of Classification Search
None
See application file for complete search history.

(56) References Cited

U.S. PATENT DOCUMENTS

| 5,436,734 | A | * | 7/1995 | Yamauchi | H04N 1/40 358/1.9 |
| 7,602,973 | B2 | * | 10/2009 | Ii | G06T 11/60 382/299 |
| 8,749,823 | B2 | * | 6/2014 | Kato | G06F 3/1222 358/1.14 |
| 8,823,989 | B2 | * | 9/2014 | Watanabe | G06F 3/12 358/1.15 |
| 8,860,997 | B2 | * | 10/2014 | Iwasa | H04N 1/0044 358/1.13 |
| 8,908,217 | B2 | * | 12/2014 | Anezaki | G06F 3/1258 358/1.13 |
| 9,141,317 | B2 | * | 9/2015 | Tawada | G06F 3/1236 |
| 2004/0179740 | A1 | * | 9/2004 | Yasuhiro | G06T 11/60 382/232 |

(Continued)

FOREIGN PATENT DOCUMENTS

JP    2004282439 A    * 10/2004

*Primary Examiner* — Scott A Rogers
(74) *Attorney, Agent, or Firm* — Staas & Halsey LLP

(57) ABSTRACT

An image forming device includes a scanner configured to generate a manuscript image by scanning a manuscript, a storage configured to store the manuscript image, an image processor configured to generate a preview image by adjusting resolution of the manuscript image, a communication unit configured to transmit the preview image to a display apparatus, and a controller configured to, in response to an editing operation with respect to the preview image being performed in the display apparatus, receive editorial data from the display apparatus and edit the manuscript image.

19 Claims, 9 Drawing Sheets

(56) References Cited

U.S. PATENT DOCUMENTS

| | | | |
|---|---|---|---|
| 2006/0271550 A1* | 11/2006 | Chadha | 707/10 |
| 2007/0133073 A1* | 6/2007 | Shida et al. | 358/527 |
| 2007/0201052 A1* | 8/2007 | Caine | G06T 5/00 358/1.2 |
| 2007/0223068 A1* | 9/2007 | Ishii et al. | 358/527 |
| 2009/0185763 A1* | 7/2009 | Park | H04M 1/7253 382/311 |
| 2010/0311327 A1* | 12/2010 | Hamada | H02J 7/025 455/41.1 |
| 2011/0116125 A1* | 5/2011 | Park | G06F 3/1204 358/1.15 |
| 2012/0246114 A1* | 9/2012 | Edmiston | G06T 11/60 707/625 |
| 2013/0088737 A1* | 4/2013 | Iwasa | H04N 1/0044 358/1.13 |
| 2013/0155450 A1* | 6/2013 | Higashikawa | B41J 2/1752 358/1.15 |
| 2013/0229673 A1* | 9/2013 | Nakayama | H04N 1/00127 358/1.13 |
| 2013/0235071 A1* | 9/2013 | Ubillos | G06F 3/0484 345/581 |
| 2014/0071061 A1* | 3/2014 | Lin et al. | 345/173 |
| 2014/0293328 A1* | 10/2014 | Wakizaka | H04N 1/00411 358/1.15 |
| 2015/0355835 A1* | 12/2015 | Tsukahara | G06F 3/04883 345/173 |

* cited by examiner

IMAGE FORMING DEVICE TO PROVIDE PREVIEW IMAGE FOR EDITING MANUSCRIPT IMAGE, DISPLAY APPARATUS TO DISPLAY AND EDIT THE PREVIEW IMAGE, AND METHODS THEREOF

CROSS-REFERENCE TO RELATED APPLICATIONS

This application claims priority under 35 U.S.C. §119 from Korean Patent Application No. 10-2014-0006553, filed on Jan. 20, 2014 in the Korean Intellectual Property Office, the disclosure of which is incorporated herein by reference in its entirety.

BACKGROUND OF THE INVENTION

1. Field of the Invention

The present general inventive concept generally relates to an image forming device and a display apparatus, and more particularly, to an image forming device which generates a preview image of a scanned manuscript, a display apparatus which displays the preview image, and methods thereof.

2. Description of the Related Art

With the development of electronic technologies, various types of electronic products are used. Specially, various image forming devices, such as a printer, a scanner, a multi-functional device, a facsimile, etc., are commonly used in a general domestic environment as well as an office environment such as a company, a school, a development room, etc.

Such an image forming device may include various pieces of hardware and software according to a range of sales prices. In a case of a high-end image forming device, it may provide a graphic interface function which enables a user to see a preview image of scanned data. Even if the high-end image forming device has the graphic interface, the high-end image forming device may need to provide a preview image to an external device such that a user of the external device can review the preview image before the preview image is printed.

However, in a case of a low-end image forming device, it may not include any display unit, or may be equipped with a display unit capable of displaying a few lines of texts. Accordingly, such an image forming device has a problem that, when a user executes a scanning function or a copying function of the image forming device, the user is not able to see a scanned result until an image of a scanned manuscript is printed out.

Accordingly, a necessity of a technology of providing a preview image in various methods for user convenience has been raised.

SUMMARY OF THE INVENTION

The present general inventive concept provides an image forming device which provides a display apparatus with a preview image, a display apparatus which displays the preview image, an image forming system including the image forming device and the display apparatus, and a method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming device including a scanner configured to generate a manuscript image by scanning a manuscript, a storage configured to store the manuscript image, an image processor configured to generate a preview image by adjusting a resolution of the manuscript image, a communication unit configured to transmit the preview image to an external display apparatus, and a controller configured to, in response to an editing operation with respect to the preview image being performed in the external display apparatus, receive editorial data from the display apparatus and edit the manuscript image.

Herein, the communication unit may include a near field frequency communication chip for transmitting the preview image to the display apparatus and receiving the editorial data from the display apparatus by means of a near field frequency communication method.

The editorial data may include data of a graphic object which is drawn on the preview image while the preview image is displayed in the display apparatus. In addition, in response to the editorial data being received, the controller may edit the manuscript image by overlapping the graphic object with the manuscript image stored in the storage.

The foregoing and/or other features and utilities of the present general inventive concept may also be achieved by providing a display apparatus including a communication unit configured to communicate with an image forming device and receive a preview image of a manuscript scanned by the image forming device, a display configured to display the preview image, a sensor configured to sense a user manipulation for editing the preview image, and a controller configured to generate editorial data according to a sensed result of the sensor and transmit the editorial data to the image forming device through the communication unit.

Herein, the communication unit may include a near field frequency communication chip for receiving the preview image from the image forming device and transmitting the editorial data to the image forming device by means of a near field frequency communication method.

The display apparatus may further include a storage unit configured to store an application for interworking with the image forming device. In addition, in response to the preview image being received through the communication unit by a tagging operation between the display apparatus and the image forming device being performed while the application is executed, the controller may display the preview image on the display.

In addition, in response to a drawing manipulation being sensed from the preview image while the preview image is displayed on the display, the controller may draw a graphic object on the preview image according to the drawing manipulation, and in response to the drawing manipulation being completed, transmit data of the graphic object to the image forming device through the communication unit.

The foregoing and/or other features and utilities of the present general inventive concept may also be achieved by providing a method of providing a preview of an image forming device, the method including generating a manuscript image by scanning a manuscript, generating a preview image by adjusting resolution of the manuscript image, transmitting the preview image to a display apparatus, and in response to an editing operation with respect to the preview image being performed in the display apparatus, editing the manuscript image by receiving editorial data from the display apparatus.

Herein, in response to a tagging operation between the display apparatus and the image forming device being performed, the preview image and the editorial data may be transmitted or received by means of a near field frequency communication method.

The editorial data may include data of a graphic object which is drawn on the preview image while the preview image is displayed in the display apparatus.

The foregoing and/or other features and utilities of the present general inventive concept may also be achieved by providing a method of providing a preview of a display apparatus, the method including receiving a preview image of a manuscript scanned by an image forming device, displaying the preview image, in response to a user manipulation for editing the preview image being sensed, generating editorial data according to a sensed result, and transmitting the editorial data to the image forming device.

Herein, the preview image and the editorial data may be transmitted to or received from the image forming device by means of a near field frequency communication method.

In addition, in response to a drawing manipulation being sensed from the preview image while the preview image is displayed, the generating editorial data may include drawing a graphic object on the preview image according to the drawing manipulation, and in response to the drawing manipulation being completed, generating the editorial data including data of the graphic object.

The foregoing and/or other features and utilities of the present general inventive concept may also be achieved by providing an image forming system including an image forming device configured to generate a manuscript image by scanning a manuscript and a display apparatus configured to receive a preview image of the manuscript image from the image forming device and display the preview image. In addition, in response to a drawing manipulation being inputted from the preview image, the display apparatus may transmit data of a graphic object which is drawn according to the drawing manipulation to the image forming device. In addition, the image forming device may edit the manuscript image by overlapping the graphic object with the manuscript image.

The image forming device and the display apparatus may transmit or receive the preview image and the data by means of a near field frequency communication method.

The foregoing and/or other features and utilities of the present general inventive concept may also be achieved by providing a method of providing a preview in an image forming system, the method including generating a manuscript image by scanning a manuscript and generating a preview image corresponding to the manuscript image in an image forming device, receiving and displaying the preview image in a display apparatus, preforming a drawing manipulation on the displayed preview image and transmitting data of a graphic object drawn according to the drawing manipulation to the image forming device, and editing the manuscript image by overlapping the graphing object with the manuscript image in the image forming device.

The method may further include performing communication between the image forming device and the display apparatus using an NFC method. The image forming device and the display apparatus may include an NFC chip.

The generating the preview image may include adjusting a resolution of the manuscript image to generate the preview image such that a resolution of the preview image is lower than the resolution of the manuscript image.

The generating the preview image may include changing a data size of the manuscript image to generate the preview image such that a data size of the preview image is lower than the data size of the manuscript image.

The foregoing and/or other features and utilities of the present general inventive concept may also be achieved by providing a computer-readable medium to contain computer-readable codes as a program to execute the method described above or hereinafter.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
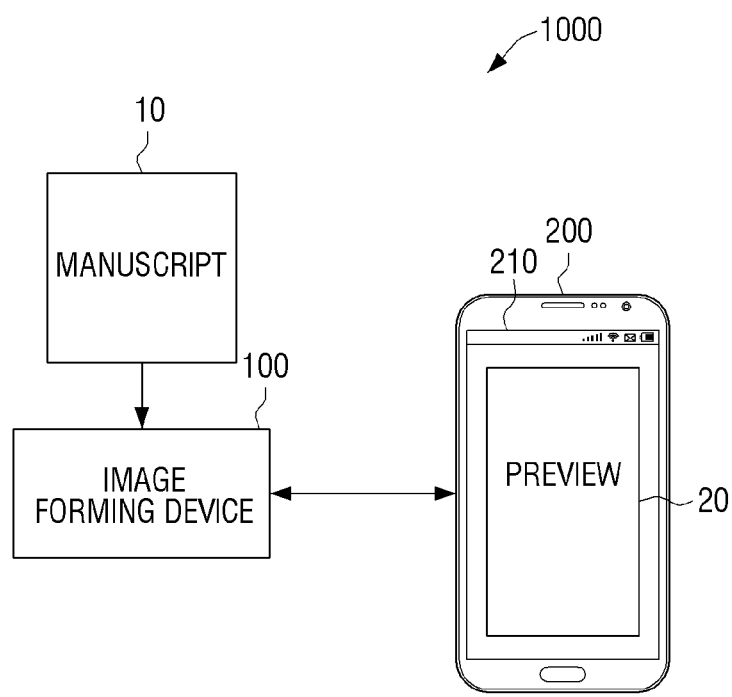
FIG. 1 is a diagram illustrating an image forming system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a diagram illustrating an image forming system 1000 according to an exemplary embodiment of the present general inventive concept. According to FIG. 1, the image forming system 1000 includes an image forming device 100 and a display apparatus 200.

The image forming device 100 refers to a device which forms an image on a paper or other various recording media. The image forming device 100 may be embodied as a printer, a scanner, a copying machine, a multifunctional device, a facsimile, etc., but herein, a device having at least a scanning function from among those devices is referred to as an image forming device.

The display apparatus 200 refers to an apparatus which is provided with a display function and structure. The display apparatus 200 may be embodied as various apparatuses such as a mobile phone, a tablet computer, a desck top Personal Computer (PC), a laptop PC, a Personal Digital Assistant (PDA), an MP3 player, etc. The display apparatus 200 may be called various names, such as a mobile device, a portable device, a user terminal device, etc., but herein, is referred to as the display apparatus 200.

In response to a manuscript 10 being fed in the scanner, the image forming device 100 performs a scanning operation and generates a manuscript image corresponding to the scanned manuscript 10. The image forming device 100 may generate a preview image 20 corresponding to the generated manuscript image.

The image forming device 100 transmits the generated preview image 20 to the display apparatus 200. The preview image may be transmitted by one of various communication methods. For example, in response to the image forming device 100 and the display apparatus 200 being equipped with a Near field Frequency Communication (NFC) chip respectively and a tagging operation between the display apparatus 200 and the image forming device 100 being performed, the preview image may be transmitted to the display apparatus 200 through a NFC method.

The NFC method refers to a non-contact wireless communication method which uses a frequency band of 13.56 Mz, for example. In addition, a tagging operation refers to an operation where the display apparatus 200 moves towards the image forming device 100 and approaches within a communication coverage range. An NFC chip may have a communication coverage range of about 10 cm, for example. In response to detection of the display apparatus 200 approaching within the communication coverage range, an NFC chip embedded in the display apparatus 200 may read information recorded in an NFC chip embedded in the image forming device 100.

A user carring the display apparatus 200 may approach close to the image forming device 100, or a user may put the display apparatus 200 on the image forming device 100. Accordingly, the preview image 20 generated in the image forming device 100 may be transmitted to the display apparatus 200. In a case of original data, for example, the manuscript image, being transmitted through the NFC method, a data transmission speed may be relatively slow as compared with other communication methods. Accordingly, the image forming device 100 reduces a resolution of the manuscript image, generates the preview image 20, and transmits the preview image to the display apparatus 200. The preview image may have a resolution lower than that of the manuscript image. The preview image may have a relatively small data size compared to a data size of the manuscript image or the manuscript 10.

The display apparatus 200 displays the transmitted preview image 20 on a display 210.

According to the above exemplary embodiment, even in case of the image forming device 100 not being equipped with a display or even in case of the image forming device 100 being equipped with a low-end display, the user is able to see a preview image by using the display apparatus 200.

Meanwhile, according to an exemplary embodiment, the user is able to edit the manuscript image through the preview image by using the display apparatus 200. For example, in response to a drawing manipulation being executed by the user while the display apparatus 200 displays the preview image, the display apparatus 200 displays a graphic object along a trace of a drawing. In response to the drawing manipulation being completed, the display apparatus 200 transmits editorial data including data of the drawn graphic object to the image forming device 100. The image forming device 100 edits the manuscript image by using the transmitted editorial data. According to the exemplary embodiment, the user is able to modify scan data by using the display apparatus 200.

In addition to the above-described editing operation, the display apparatus 200 may perform various operations, such as storing the preview image or transmitting the preview image to other external apparatus, according to a user selection.

In addition, in the aforementioned exemplary embodiment, although it was described that data is transmitted or received through the NFC method, the communication method is not limited thereto. For example, the data may be transmitted through various wireless communication methods such as Wi-Fi, Bluetooth, Zigbee, a mobile network, etc. Or, in case of the image forming device 100 and the display apparatus 200 being connected in a wired manner, the data may be transmitted through a wired communication method.

Figure 2:
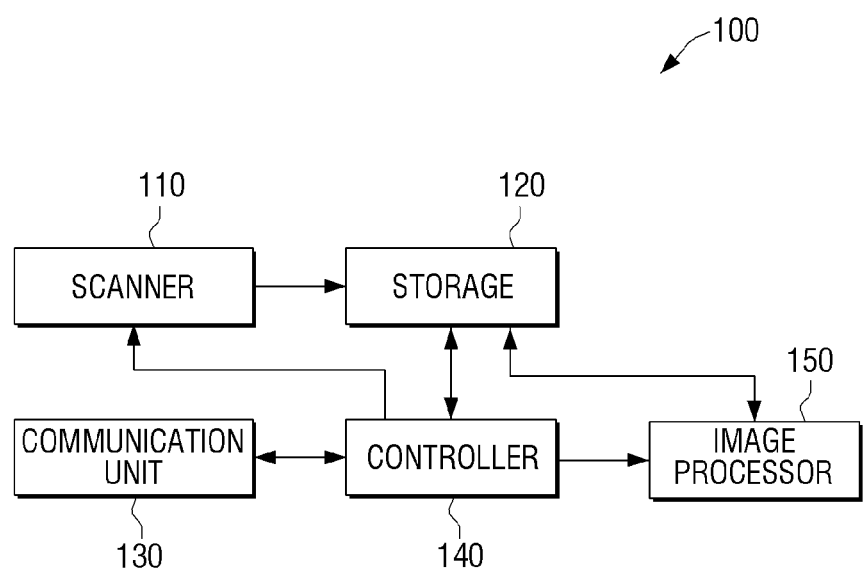
FIG. 2 is a block diagram illustrating an image forming device according to an exemplary embodiment of the present general inventive concept.

FIG. 2 is a block diagram illustrating the image forming device 100 of FIG. 1 according to an exemplary embodiment of the present general inventive concept. According to FIG. 2, the image forming device 100 includes a scanner 110, a storage 120, a communication unit 130, a controller 140, and an image processor 150.

The scanner 110 is a component to perform a scanning operation. The scanner 110 may be embodied as various forms. For example, the scanner 110 may include a scanner engine controller (not illustrated), a scanning unit (not illustrated), a scan motor (not illustrated), and the like.

In response to a scanning command being transmitted from the controller 140, the scanner engine controller controls each component of the scanner 110 to perform a scanning operation. The scanning unit is a component to scan an object, for example, a manuscript. The scan motor moves a light source or a paper, and scans the manuscript according to control of the scanner engine controller. The scanning unit performs a scanning operation by using an image reading sensor, a lens, a light source, etc. The image reading sensor may include a photoelectric converter configured to generate an electric charge by absorbing a reflected light emitted from a light source and reflected from a manuscript, a signal detector configured to detect the electric charge generated by the photoelectric converter, convert the detected electric charge into an electrical signal, and generate image data, etc. The image data detected by the signal detector is transmitted to the scanner engine controller. The scanner engine controller generates a manuscript image by performing various signal processing operations, such as shading, gamma correction, Dot Per Inch (DPI) conversion, edge emphasis, error diffusion, scaling, and the like, with respect to the transmitted image data.

The storage 120 stores the generated manuscript image. The storage 220 may be embodied variously as a hard disk player, a semiconductor memory chip, a flash memory, an external hard disk drive, etc. The storage 120 may store various programs and data.

The controller 140 may control the image forming device 100 by using the programs and data stored in the storage 120. For example, in response to a scanning command being inputted through a button (not illustrated) installed on a body of the image forming device 100 or other input means, the controller 140 controls the scanner 110 to start a scanning operation.

The image processor 150 may generate the preview image by adjusting a resolution of the manuscript image generated by the scanner 110 and stored in the storage 120. A resolution adjusting ratio may be predetermined and stored in the storage 140. The image processor 150 reduces the resolution by deleting a portion of pixels within the manuscript image according to the resolution adjusting ratio. Accordingly, the image processor 150 may generate the preview image having a relatively small data size, compared to the manuscript image. Although FIG. 2 illustrates that the image processor 150 is a component separated from the scanner 110, the image processor 150 may be omitted and a function of the image processor 150 may be performed by the scanner engine controller within the scanner 110, according to an exemplary embodiment.

The communication unit 130 is a component to communicate with the display apparatus 200. The communication unit 130 transmits the preview image generated by the image processor 150 to the display apparatus 200. The communication unit 130 may be embodied as various forms according to an exemplary embodiment. In an exemplary embodiment of transmitting or receiving data through the NFC method, the communication unit 130 may include an NFC chip. The NFC chip may be formed of a combination of a tag and a reader. The tag may generate a Radio Frequency (RF) signal including preview image data by using various modulation methods and coding methods. A modulation operation may be performed by various methods such as Amplitude Shift Keying (ASK), Frequency Shift Keying (FSK), Phase Shift Keying (PSK), etc. A coding operation may be performed by a Modified Miller coding method, a Manchester coding method, etc. In response to a tagging operation of the display apparatus 200 being performed, the NFC chip in the communication unit 130 may transmit the preview image processed by the aforementioned method to the display apparatus 200.

Meanwhile, as described above, in response to other communication unit, such as a Wi-Fi chip or a Bluetooth chip, being included in the image forming device 100, the image forming device 100 may transmit the preview image by using the corresponding communication unit.

In response to the tagging operation of the display apparatus 200 being performed after the scanning operation is performed, the controller 140 may control the image processor 150 to generate the preview image. It is possible that the tagging operation can be performed before the scanning operation. The controller 140 may record the generated preview image in a tag within the NFC chip, and provide the display apparatus with the preview image.

Meanwhile, as described above, an editing operation with respect to the preview image may be performed in the display apparatus 200. In response to the editing operation being completed in the display apparatus 200, the communication unit 130 may receive editorial data. In response to the received editorial data, the controller 140 may edit the manuscript image by using the editorial data. The controller 140 may store the edited manuscript image as a new manuscript image in the storage 120. It is possible that the storage 120 stores the manuscript image and the new manuscript image. It is also possible that the storage 120 stores the editorial data as a file to be usable to edit another manuscript image to generate a new another manuscript image.

FIG. 2 is a drawing illustrating the image forming device 100 having a scanning function, and the image forming device 100 may be changed variously depending upon a performance thereof. For example, an image forming device including a printing function may further include a printing unit (not illustrated) to print an image on a print medium according to the manuscript image or the new manuscript image or according to data received from an external apparatus. In addition, the image forming device 100 may further include components such as a bus for data exchange between the components, a buffer for temporarily storing data, etc. In addition, the image forming device 100 may further include elements such as a power input circuit for receiving a prevailing alternating current power from an external source, a transformer for converting the received power into a voltage of a usable level, an inverter, a rectifier, etc.

In response to the image forming device 100 including the printing unit (not illustrated) and a printing command being received in this state, the controller 140 may output the edited manuscript image. Since the printing unit is well known, detail descriptions thereof will be omitted. In response to a sharing command, a mail sending command, or a facsimile sending command being received, the controller 140 may process the edited manuscript image in response to the command.

Figure 3:
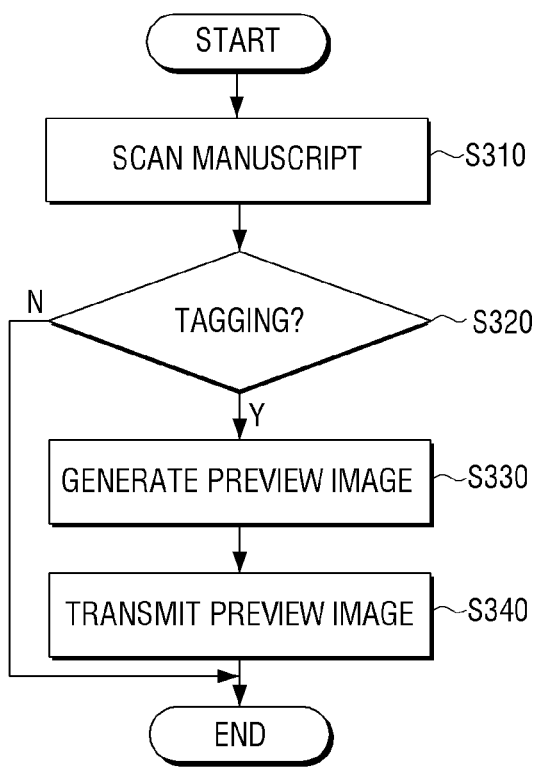
FIG. 3 is a flow chart illustrating a method of providing a preview of an image forming device according to an exemplary embodiment of the present general inventive concept.

FIG. 3 is a flow chart illustrating a method of providing a preview in an image forming device according to an exemplary embodiment of the present general inventive concept. According to FIG. 3, in response to the tagging operation between the display apparatus 200 and the image forming device 100 being performed at operation S320 after a manuscript is scanned at operation S310, the image forming device 100 may generate a preview image by adjusting a resolution of a manuscript image at operation S330. The image forming device 100 may transmit the generated preview image to the display apparatus 200 at operation S340. Accordingly, the user is able to check a scanned result by using the display apparatus 200.

Figure 4:
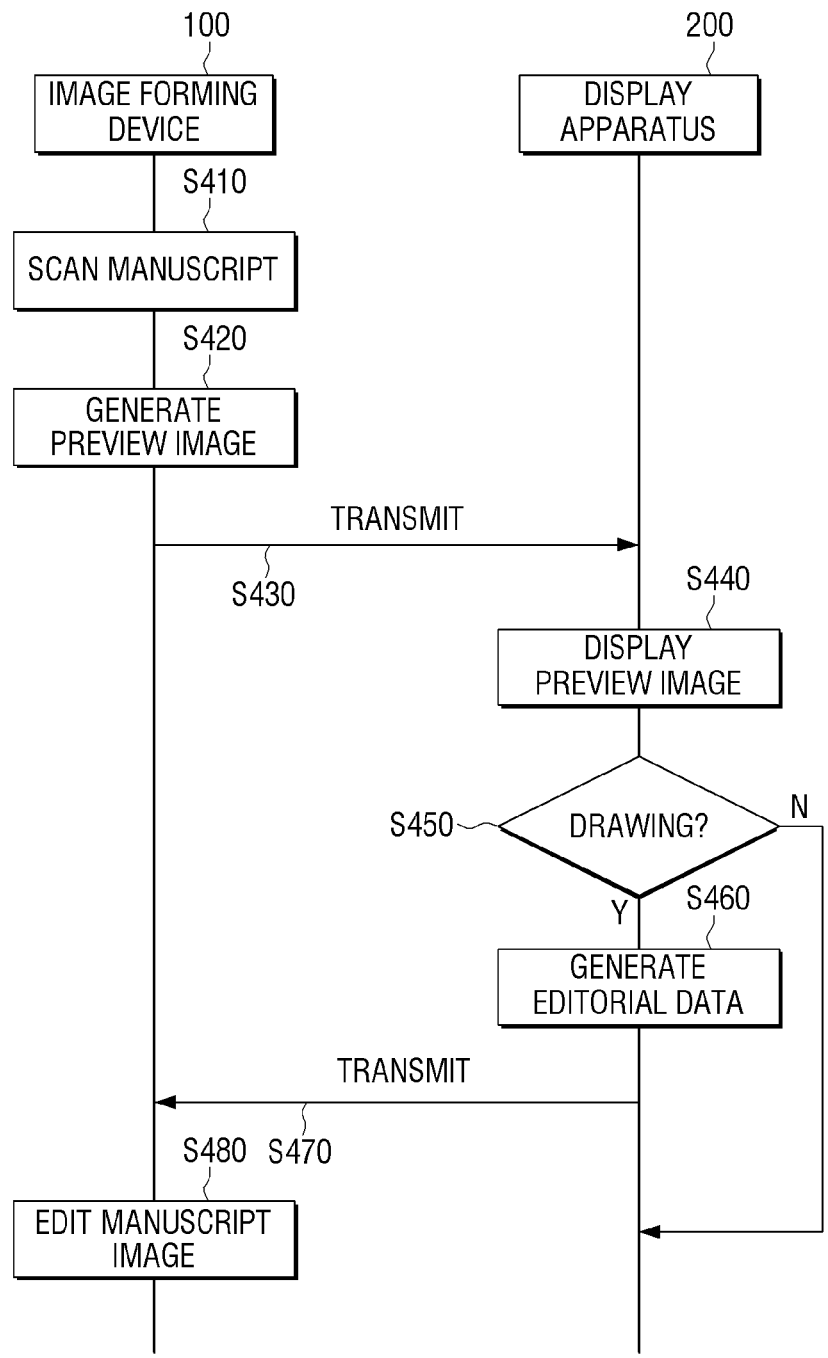
FIG. 4 is a flow chart illustrating a method of providing a preview image of an image forming device according to an exemplary embodiment of the present general inventive concept.

FIG. 4 is a flow chart illustrating a method of providing a preview image in an image forming system according to an exemplary embodiment of the present general inventive concept. According to FIG. 4, in response to a manuscript being scanned at operation S410, the image forming device 100 generates a preview image of a manuscript image at operation S420. The image forming device 100 transmits the preview image to the display apparatus 200 at operation S430.

The display apparatus 200 may display the transmitted preview image at operation S440. In response to a user drawing manipulation being inputted while the preview image is displayed at operation S450, the display apparatus 200 may generate editorial data according to the drawing manipulation at operation S460. The display apparatus 200 transmits the generated editorial data to the image forming device 100 at operation S470. The image forming device 100 edits the manuscript image by using the transmitted editorial data at operation S480.

In FIG. 4, transmitting a preview image at operation S430 and transmitting the editorial data at operation S470 may be performed through the NFC method, respectively. A tagging operation may be performed at each of the operations S430 and S470, but the present general inventive concept is not limited thereto. For example, in response to the display apparatus 200 staying within a communication coverage range of the image forming device 100, the transmitting the preview image and the transmitting the editorial data may be performed.

In response to connection information being exchanged (transmitted or received) through the NFC method, communication may be performed through the corresponding communication method, such as Wi-Fi, Bluetooth, etc., by using the connection information. The connection information may include various pieces of information such as Service Set Identifier (SSID), an encryption key, an Internet Protocol (IP) address, an apparatus name, a serial number, etc.

The aforementioned method of providing and editing the preview image may be embodied to be performed only in response to a preview providing function or a preview editing function being set in the image forming device. For example, the user is able to set the preview providing function and the preview editing function selectively in a function setting screen of the image forming device 100. In response to the preview providing function being set and the tagging operation of the display apparatus 200 being performed, the controller 140 provides the preview image. In response to the preview providing function not being set, the controller 140 may not generate or provide the preview image. In addition, in response to the preview editing function being set and the editorial data being received from the display apparatus 200, the controller 140 edits the manuscript image based on the editorial data. In response to the preview editing function not being set, the controller 140 may maintain an original state of the manuscript image even though the editorial data is received. According to various exemplary embodiment, the preview providing function and the preview editing function may be embodied to be set independently, but may be embodied as a single option to set the preview providing function and the preview editing function together. That is, in response to the preview providing function being set, the image forming device 100 may perform the preview editing function as well, as described in connection with FIG. 4.

Figure 5:
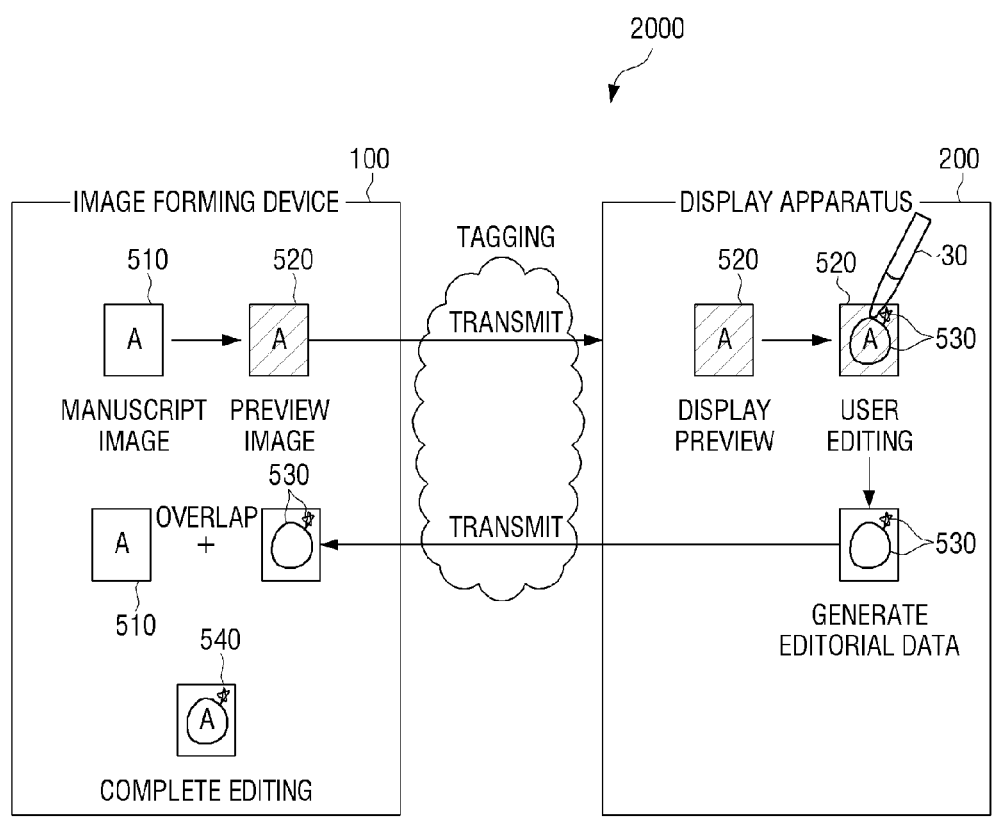
FIG. 5 is a diagram an image forming system to perform a method of FIG. 4 according to an exemplary embodiment of the present general inventive concept.

FIG. 5 is a diagram illustrating an image forming system 2000 to perform the method of FIG. 4 according to an exemplary embodiment of the present general inventive concept. According to FIG. 5, in response to a manuscript image 510 being generated, the image forming device 100 generates a preview image 520 by reducing the resolution of the manuscript image 510. The image forming device 100 may transmit the preview image 520 while the display apparatus 200 is tagged. The display apparatus 200 displays the transmitted preview image 520.

In response to a drawing manipulation being executed by a user by using a means, for example, a pen 30, a finger, or other input means in this state, the display apparatus 200 displays a graphic object 530 by drawing a line along to a trace of a drawing. In response to an input being completed, the display apparatus 200 generates data of the inputted graphic object 530 in a form of an image file, and transmits the image file to the image forming device 100.

The image forming device 100 may generate a new manuscript image 540 by overlapping the graphic object 530 with the manuscript image 510 by using a bitmap overlay algorithm.

Figure 6:
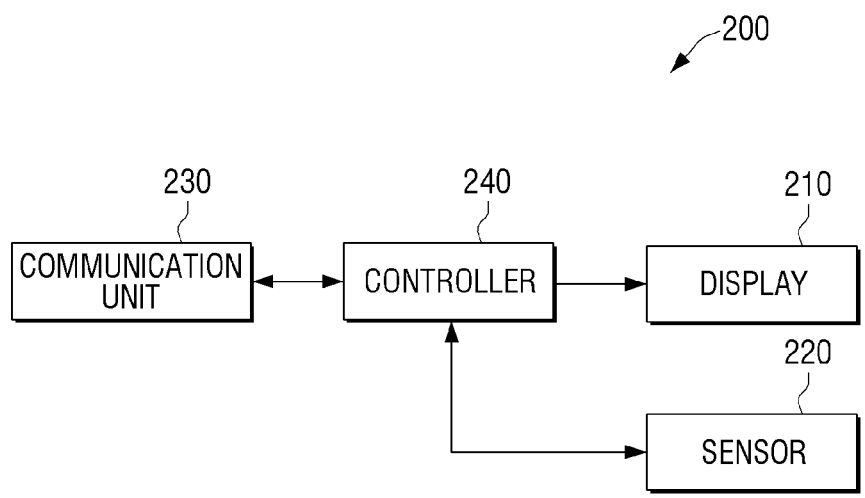
FIG. 6 is a block diagram illustrating a display apparatus according to an exemplary embodiment of the present general inventive concept.

FIG. 6 is a block diagram illustrating the display apparatus 200 of FIG. 1 or 5 according to an exemplary embodiment of the present general inventive concept. According to FIG. 6, the display apparatus 200 includes the display 210, a sensor 220, a communication unit 230, and a controller 240.

The communication unit 230 is a component to communicate with other external apparatuses including the image forming device 100. In response to communication being performed with the image forming device 100, the communication unit 230 may receive a preview image of a manuscript scanned by the image forming device 100. In response to an NFC chip being embedded in the communication unit 230, the preview image may be transmitted through the NFC method, but the present general inventive concept is not limited thereto. The preview image may be transmitted through other communication method.

The display 210 displays the preview image received through the communication unit 230.

The sensor 240 is a component to sense a user manipulation to edit the preview image displayed in the display 210.

In response to a drawing manipulation being sensed from the preview image while the preview image is displayed in the display 210, the controller 240 may draw a graphic object on the preview image according to the drawing manipulation. In response to the drawing manipulation being completed, the controller 240 may transmit data of the drawn graphic object to the image forming device 100 through the communication unit 230.

Figure 7:
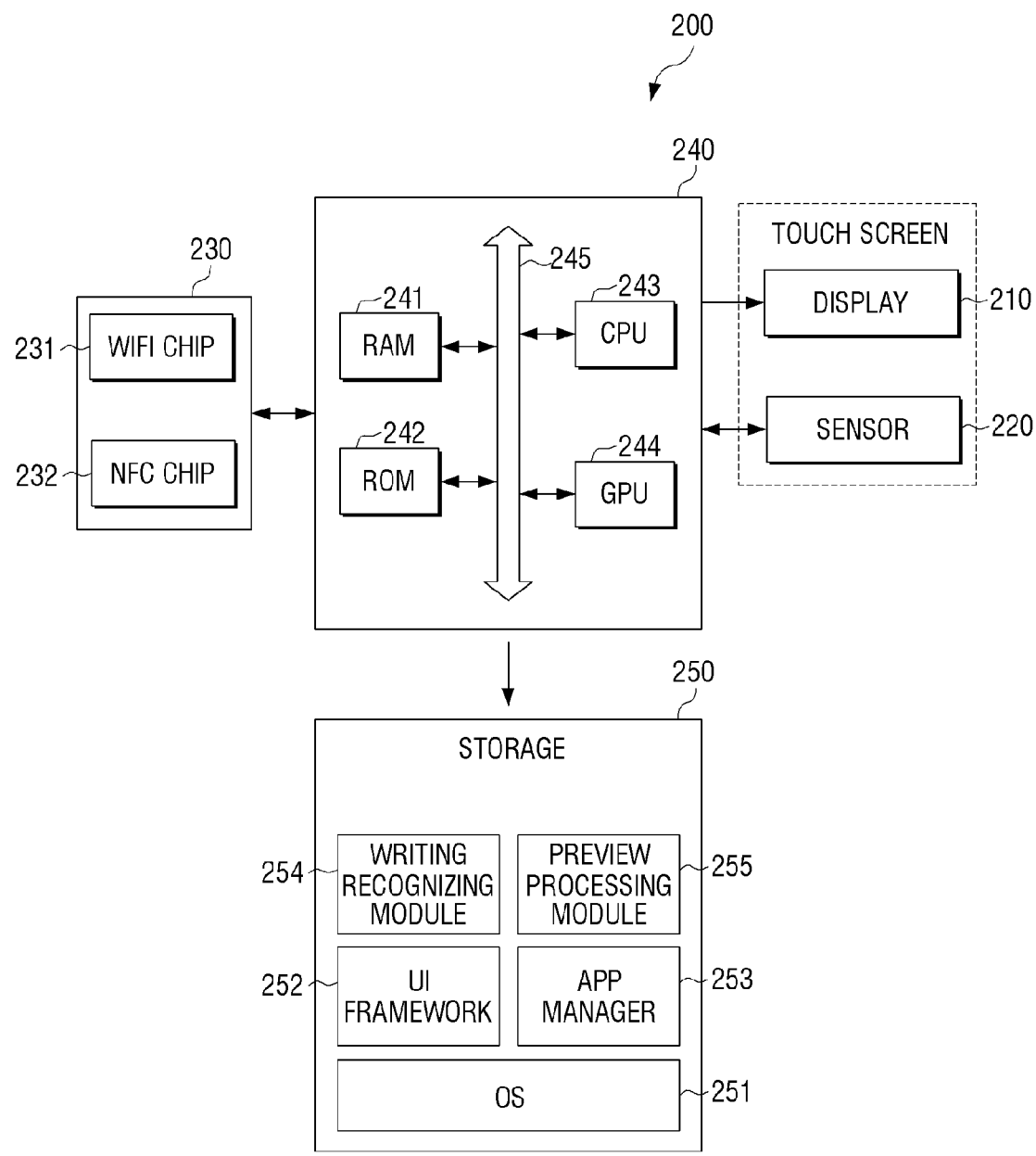
FIG. 7 is a block diagram illustrating a display apparatus according to an exemplary embodiment of the present general inventive concept.

FIG. 7 is a block diagram illustrating the display apparatus 200 according to an exemplary embodiment of the present general inventive concept. According to FIG. 7, the display apparatus 200 includes the display 210, the sensor 220, the communication unit 230, the controller 240, and a storage 250.

The communication unit 230 includes a communication means such as a Wi-Fi chip 321, an NFC chip 232, etc. As described above, in response to the tagging operation between the display apparatus 200 and the image forming device 100 being performed, the communication unit 230 may receive a preview image by using the NFC chip 232.

The display 210 displays the received preview image, and the sensor 220 senses a user manipulation with respect to the preview image. The sensor 220 may be embodied as a touch sensor, and thus, may form a single touch screen panel by being integrated with the display 210.

The sensor 220 may be embodied as at least one of various types of touch sensors such as a capacitive type, a pressure-resistive type, a piezoelectric type, etc. The capacitive type refers to a method of sensing micro electricity which is excited into a user's body in response to a touch of a portion of the user's body with respect to a surface of the display 210, thereby calculating a touch coordinate. The pressure-resistive type refers to a method of embedding two electrode plates into the display 210, and in response to a user touch with respect to a screen, sensing a current which flows as the two electrode plates embedded in the display 210, that is, an upper plate and a lower plate, contact each other at a touch point, thereby calculating a touch coordinate. The piezoelectric type refers to a method of calculating a touch coordinate according to an electric signal generated in a piezoelectric element in a position where the user touched.

The sensor 220 may sense a user manipulation using other input means, such as a pen, than a user's finger. In case of an input means that is a stylus pen including an inner coil, the sensor 220 may include a magnetic field sensor to sense a magnetic field which varies by the inner coil of the stylus pen. Hence, the sensor 220 may sense an approach manipulation, that is, a hovering, as well as a touch manipulation. The hovering operation refers to an operation which brings a finger or a pen up close to a screen.

In response to the user manipulation, the sensor 220 notifies the sensed result to the controller 140. For example, in response to a certain point on a screen being touched by a pen or a finger, the sensor 220 notifies an x-coordinate value and a y-coordinate value of the touched point to the controller 240. In response to the touch pointed being moved while the user maintains the touch operation, the sensor 220 notifies a varying touch coordinate value to the controller 240 in real time. The controller 240 renders a graphic object according to the touch coordinate values sensed by the sensor 220.

Meanwhile, as described above, the sensor 220 may sense a hovering manipulation and/or a direct touch manipulation. In addition, the sensor 220 may sense a user manipulation of pressing a button installed on a body of the display apparatus 200, and in response to a camera being included in the sensor, the sensor 220 may sense a gazing manipulation where the user gazes at an object in a screen. In response to a microphone being included in the sensor, the sensor 220 may recognize a user voice. In response to a user manipulation for editing a preview image, such as the gazing manipulation, a button manipulation, a voice recognition, etc., being inputted, even though the user does not perform a drawing manipulation on the preview image by using the input means, such as a pen or a finger, the controller 240 may generate editorial data according to such user manipulation. In case of the button manipulation, in response to a curser being moved to a certain point on a preview image by a user by using a direction button, and being moved again by the user by pressing an OK button, and pressing the direction button again, the controller 240 may render a graphic object along to a curser movement trace while moving the cursor according to the direction button.

The storage 250 may store various programs and data to control an operation of the display apparatus 200. According to FIG. 7, the storage 250 may store a software module such as an Operating System (O/S) 251, a User Interface (UI) framework 252, an Application (App) manager 253, a writing recognizing module 254, a preview processing module 255, etc.

The O/S 251 controls and manages overall operations of hardware. The O/S 251 performs basic functions such as a hardware management function, a memory function, a security function, etc.

The UI framework 252 is a software module to generate various UIs which are displayed in the display 210. The UI framework 252 may include an Image Compositor Module which forms various graphic objects, a coordinate compositor which calculates a coordinate where a graphic object will be displayed, a rendering module which renders the formed graphic object on the calculated coordinate, a two-dimensional (2D)/a three-dimensional (3D) tool kit which provides a tool for forming a 2D UI or a 3D UI.

The APP manager 253 is a module which manages an execution state of various applications installed in the storage 250. In response to an event in which a particular application is selected being sensed by the sensor 220, the controller 240 calls and executes an application corresponding to the event by using the App manager 253.

The writing recognizing module 254 is a module to parse a trace made by a drawing manipulation performed by a user on the surface of the display 210. The writing recognizing module 254 receives coordinate values of touched points sensed by the sensor 220 and stores the coordinate values of the touched points as strokes. The writing recognizing module 254 may generate a stroke array by using the strokes.

The UI framework 252 may draw a graphic line along the stroke array generated by the writing recognizing module 254. In response to a picture drawn on a screen by the user by using a pen, the controller 240 draws a graphic line along a trace that the pen passes by executing the UI framework 252. A thickness of a line may vary depending upon a pressure applied to the screen by the pen or a size of an area where the pen and the screen come into contact with each other. In addition, a color or a shape of the line may vary depending upon a user setting.

The preview processing module 255 is an application to display a preview image by interworking with the image forming device 100. In response to an icon corresponding to the preview processing module 255 being selected, the controller 240 executes the preview processing module 255. In response to the tagging operation between the display apparatus 200 and the image forming device 100 being performed while the preview processing module 255 is executed, the communication unit 230 may receive the preview image from the image forming device 100. In a state where the preview processing module 255 is not executed, the communication unit 230 may not receive the preview image, or even though the preview image is received, the communication unit 230 may discard the received preview image without storing the preview image in the storage 250. In response to receipt of the preview image, the preview processing module 255 activates the display 210 and displays the preview image. Meanwhile, according to an exemplary embodiment, in response to the preview image received through the NFC method, the controller 140 may display the preview image in the display 210 by automatically executing the preview processing module 255.

In a case where the preview processing module 255 is not installed in the display apparatus 200 in advance, the display apparatus 200 may access to an external server by using address information transmitted by the tagging operation between the display apparatus 200 and the image forming device 100, thereby downloading a preview processing module. For example, in response to the tagging operation of the display apparatus 200, the image forming device 100 may provide various pieces of information such as a Uniform/Universal Resource Locator (URL) or an IP address of a server, a name of application capable of processing a preview, a serial number or a model number of the image forming device, a scanned date, a type of manuscript, etc. The controller 240 may transmit an application download request to the received URL or IP address, download a corresponding application, and install the downloaded application in the storage 250. The controller 240 may display the preview image by executing the installed application, that is, the preview processing module 255.

The storage 250 may store various security modules or application modules, but the detailed illustration and description thereof are omitted.

The controller 240 may control the operation of the display apparatus 200 by using the programs and data stored in the storage 250.

According to FIG. 7, the controller 240 includes a Random Access Memory (RAM) 241, a Read-Only Memory (ROM) 242, a Central Processing Unit (CPU) 243, a Graphic Processing Unit (GPU) 244, and a bus 245. The RAM 241, the ROM 242, the CPU 243, and the GPU 244 may be connected to each other through the bus 245.

The CPU 243 accesses the storage 250 and performs a booting operation by using the O/S 251 stored in the storage 250. In addition, the CPU 243 performs various operations by using various programs, contents, and data stored in the storage 250. For example, in response to a user touch which is performed with respect to an icon while the icon corresponding to the preview processing module 255 is displayed in the display and sensed, the CPU 243 executes the preview processing module 255. In response to the preview image being received in this state through the tagging operation, the CPU 243 may display the preview image in the display 210.

The ROM 242 stores a command set to boot a system. In response to power being supplied by an input of a turn-on command, the CPU 243 copies the O/S stored in the storage 250 into the RAM 241 according to a command stored in the ROM 242, and boots a system by executing the O/S. In response to the booting being completed, the CPU 243 copies various programs stored in the storage 250 into the RAM 241 to perform various operations by executing the programs copied into the RAM 241.

The GPU 244 is a component to generate various screens displayed in the display apparatus 200. The GPU 244 may generate a screen including various objects, such as an icon, an image, a text, etc., by executing the UI framework 252. FIG. 7 illustrates that the GPU 244 is included in the controller 140, but the GPU 244 may be provided as a separate component according to an exemplary embodiment.

In response to an input means being brought onto and moved over the preview image by the user while the preview image is displayed, the GPU 244 renders a graphic object along a movement trace of the input means. In response to no drawing manipulation being executed for a certain period after the rendering operation is performed or an editing complete menu being selected by the user, the CPU 243 may generate editorial data including the rendered graphic object.

Figure 8:
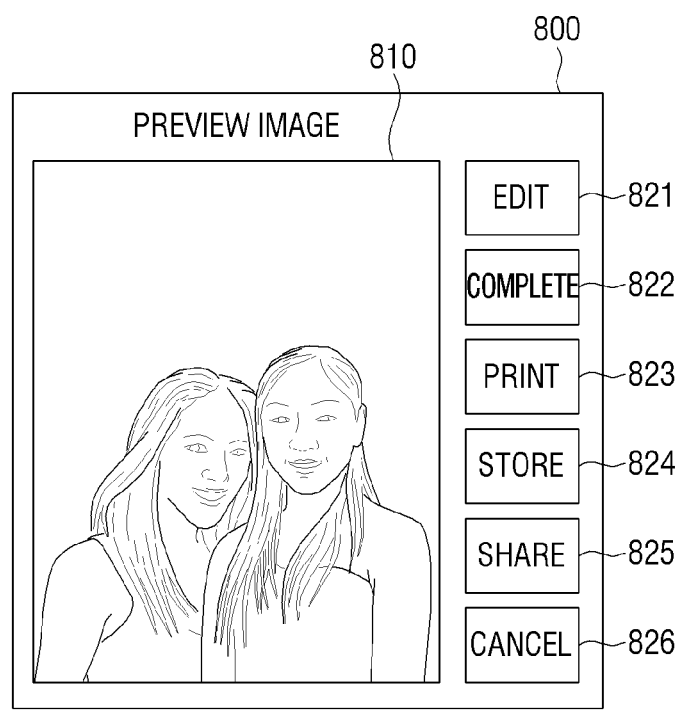
FIG. 8 is a diagram illustrating an example of a preview image screen displayed on a display apparatus according to an embodiment of the present general inventive concept.

FIG. 8 is a diagram illustrating a preview image screen 800 displayed on a display apparatus. According to FIG. 8, the preview image screen 800 includes a preview image 810 and various menus 821 to 826.

In response to an edit menu being selected from the preview image screen 800, the controller 240 displays a graphic object according to a touch manipulation which is subsequently inputted with respect to the preview image 810. In response to selection of a complete menu 822 by the user, the controller 240 recognizes that an editing operation is completed, and generates editorial data to express or indicate the graphic object drawn by the user, in a form of an image file. Accordingly, the controller 240 may transmit the editorial data through the communication unit 230. In response to a print menu 823 or a store menu 824 being selected from among the other menus 823 to 826, the controller 240 may generate a control command corresponding to the selected menu, and transmit the generated control command to the image forming device 100. Accordingly, the image forming device 100 may perform a printing operation or a storing operation. In response to selection of a share menu 825, the controller 240 may display a screen where the user is able to select a telephone number or other contact information of other user who share the preview image, and in response to selection of at least one of the contact information from the screen, may transmit the preview image based on the selected contact information.

When a scanned manuscript includes a plurality of pages, a plurality of preview images may be generated to correspond to the plurality of pages. In this case, the user is able to convert the preview images on a page basis, or see a preview image of each page by scrolling the pages. For example, in the preview image screen 800 as illustrated in FIG. 8, in response to a preview image 810 being touched and dragged or flicked in a certain direction by a user, the controller 240 may display a preview image of a previous page or a next page according to a dragging direction or flicking direction.

Figure 9:
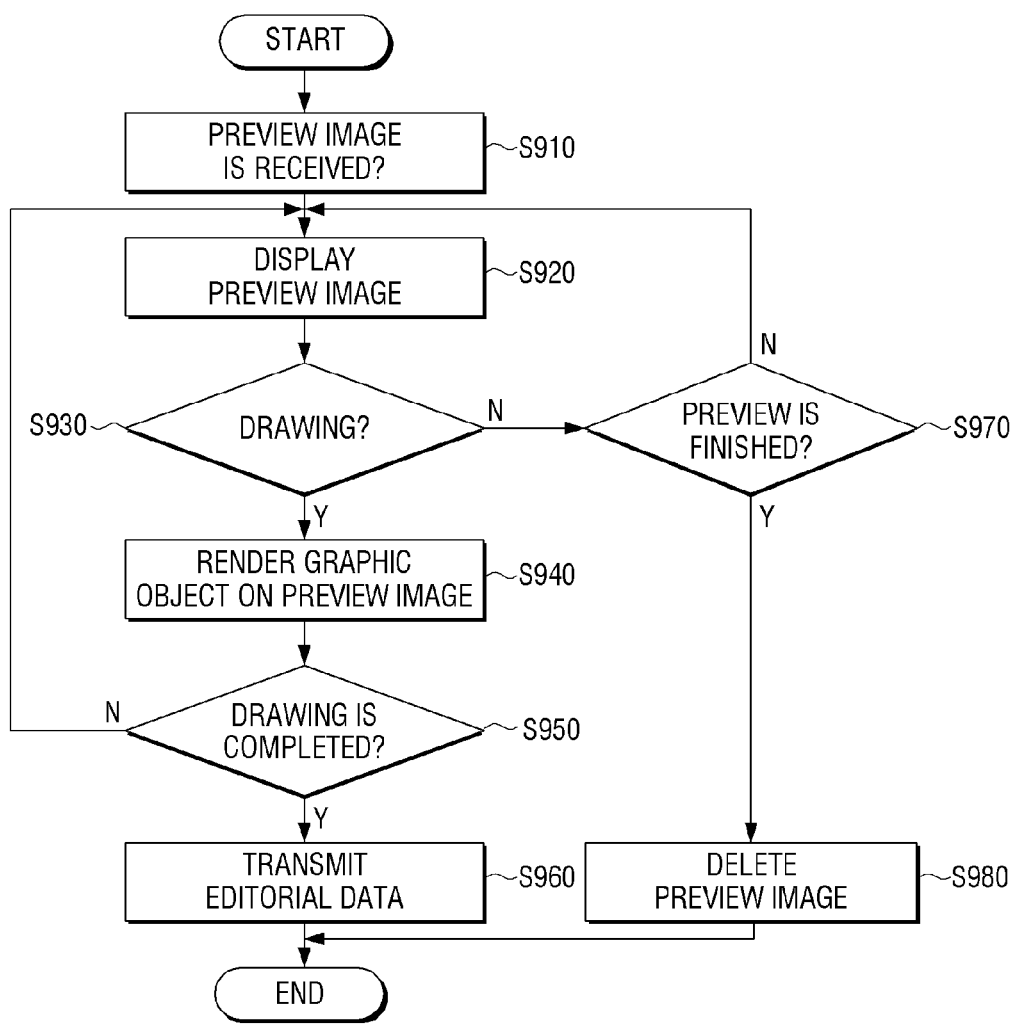
FIG. 9 is a flow chart illustrating a method of providing a preview image of a display apparatus according to an exemplary embodiment of the present general inventive concept.

FIG. 9 is a flow chart illustrating a method of providing a preview image of the display apparatus according to an exemplary embodiment of the present general inventive concept. According to FIG. 9, in response to a preview image of a manuscript scanned by the image forming device 100 being received at operation S910, the display apparatus 200 displays the received preview image at operation S920.

In response to a drawing manipulation being received in this state at operation S930, the display apparatus 200 renders a graphic object drawn by the user on the preview image at operation S940. In response to the drawing being completed at operation S950, the displays apparatus 200 may generate editorial data including data of the drawn graphic object and transmit the generated editorial data to the image forming device 100 at operation S960. The editorial data may include various pieces of information such as a display position, a line thickness, a color, a form, a display method of the graphic object, etc.

In response to selection of a menu to finish a preview operation by the user without any drawing manipulation or a predetermined time elapsing, the display apparatus 200 determines that the preview operation is finished at operation S970, and deletes the preview image at operation S980.

As described above, the display apparatus 200 may provide a user with a preview image of a manuscript scanned by the image forming device 100 so that the user is able to use the preview image conveniently. Accordingly, the user is able to check a scanned result immediately regardless of a specification of the image forming device.

The methods of providing or editing a preview image in the image forming device and the display apparatus according to the aforementioned exemplary embodiment may be coded as software program and stored in a non-transitory readable medium. Such a non-transitory readable medium may be used by being mounted on various apparatuses.

As an example, a non-transitory readable medium may store a program code to execute a method of generating a manuscript image by scanning a manuscript, generating a preview image by adjusting the resolution of the manuscript image, transmitting the preview image to the display apparatus, and in response to an editing operation with respect to the preview image being performed in the display apparatus, receiving editorial data from the display apparatus and editing the manuscript image. The medium may be mounted on an image forming device.

The non-transitory readable medium may store a program code to execute a method of receiving a preview image of a manuscript scanned by the image forming device, displaying the preview image, in response to a user manipulation for editing the preview image being sensed, generating editorial data according to the sensed result, and transmitting the editorial data to the image forming device. The medium may be mounted on a display apparatus.

The non-transitory readable medium refers to a medium which may store data semi-permanently rather than storing data for a short time such as a register, a cache, and a memory and may be readable by an apparatus. Specifically, the above-described various applications and programs may be stored in the non-transitory readable medium like a compact disc (CD), a digital versatile disk (DVD), a hard disk, a Blu-ray disk, a universal serial bus (USB), a memory card, a semiconductor memory chip, and a read-only memory (ROM), etc., and provided therein.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. An image forming device comprising:
  a scanner configured to generate a manuscript image by scanning a manuscript;
  a storage configured to store the manuscript image;
  an image processor configured to generate a preview image by adjusting a resolution of the manuscript image;

a communicator configured to transmit the preview image to an external display apparatus configured to store an application to interwork with the image forming device; and a controller configured to, in response to an editing operation with respect to the preview image being performed in the external display apparatus, receive editorial data from the external display apparatus and edit the manuscript image according to the received editorial data, wherein in response to the preview image being received by the external display apparatus by a tagging operation between the external display apparatus and the image forming device being performed while the application is executed, the external display apparatus displays the received preview image.

2. The device of claim 1, wherein the communicator comprises a near field frequency communication chip to transmit the preview image to the external display apparatus and to receive the editorial data from the external display apparatus by means of a near field frequency communication method.

3. The device of claim 2, wherein:
the editorial data comprises data of a graphic object which is drawn on the preview image while the preview image is displayed in the external display apparatus; and
in response to the editorial data being received, the controller edits the manuscript image by overlapping the graphic object with the manuscript image stored in the storage.

4. A display apparatus comprising:
a communicator configured to communicate with an external image forming device and receive a preview image of a manuscript scanned by the external image forming device;
a display configured to display the preview image;
a sensor configured to sense a user manipulation to edit the preview image;
a controller configured to generate editorial data according to a sensed result of the sensor and transmit the editorial data to the external image forming device through the communicator; and
a storage unit configured to store an application to interwork with the external image forming device,
wherein in response to the preview image being received through the communicator by a tagging operation between the display apparatus and the external image forming device being performed while the application is executed, the controller displays the preview image on the display.

5. The apparatus of claim 4, wherein the communicator comprises a near field frequency communication chip to receive the preview image from the external image forming device and transmitting the editorial data to the external image forming device by means of a near field frequency communication method.

6. The apparatus of claim 4, wherein:
in response to a drawing manipulation being sensed from the preview image while the preview image is displayed on the display, the controller draws a graphic object on the preview image according to the drawing manipulation; and
in response to the drawing manipulation being completed, the controller transmits data of the graphic object to the image forming device through the communicator.

7. A method of providing a preview of an image forming device, the method comprising:
generating a manuscript image by scanning a manuscript;
generating a preview image by adjusting a resolution of the manuscript image;
transmitting the preview image to an external display apparatus;

storing an application at the external display apparatus to interwork with the image forming device; and in response to an editing operation with respect to the preview image being performed in the external display apparatus, editing the manuscript image by receiving editorial data from the external display apparatus, wherein in response to the preview image being received by the external display apparatus by a tagging operation between the external display apparatus and the image forming device being performed while the application is executed, the external display apparatus displays the received preview image.

8. The method of claim 7, wherein in response to a tagging operation between the external display apparatus and the image forming device being performed, the preview image and the editorial data are transmitted or received by means of a near field frequency communication method.

9. The method of claim 8, wherein the editorial data comprises data of a graphic object which is drawn on the preview image while the preview image is displayed in the external display apparatus.

10. A method of providing a preview of a display apparatus, the method comprising:
storing an application to interwork with an external image forming device,
receiving a preview image of a manuscript scanned by the external image forming device;
displaying the preview image in response to the preview image being received by a tagging operation between the display apparatus and the external image forming device being performed while the stored application is executed;
in response to a user manipulation to edit the preview image being sensed, generating editorial data according to a sensed result; and
transmitting the editorial data to the external image forming device.

11. The method of claim 10, wherein the preview image and the editorial data are transmitted to or received from the external image forming device by means of a near field frequency communication method.

12. The method of claim 11, wherein in response to a drawing manipulation being sensed from the preview image while the preview image is displayed, the generating editorial data comprises:
drawing a graphic object on the preview image according to the drawing manipulation; and
in response to the drawing manipulation being completed, generating the editorial data including data of the graphic object.

13. An image forming system comprising:
an image forming device configured to generate a manuscript image by scanning a manuscript; and
a display apparatus configured to store an application to interwork with the image forming device, to receive a preview image of the manuscript image from the image forming device, and to display the preview image in response to the preview image being received by a tapping operation between the display apparatus and the image forming device being performed while the application is executed,
wherein in response to a drawing manipulation being inputted from the preview image, the display apparatus transmits data of a graphic object which is drawn according to the drawing manipulation to the image forming device, and
wherein the image forming device edits the manuscript image by overlapping the graphic object with the manuscript image.

14. The system of claim 13, wherein the image forming device and the display apparatus transmit or receive the preview image and the data by means of a near field frequency communication method.

15. A method of providing a preview in an image forming system, the method comprising:
storing an application to interwork an image forming device and a display apparatus;
generating a manuscript image by scanning a manuscript and generating a preview image corresponding to the manuscript image in an image forming device;
receiving and displaying the preview image in the display apparatus in response to the preview image being received by a tagging operation between the display apparatus and the image forming device being performed while the application is executed;
preforming a drawing manipulation on the displayed preview image and transmitting data of a graphic object drawn according to the drawing manipulation to the image forming device; and
editing the manuscript image by overlapping the graphing object with the manuscript image in the image forming device.

16. The method of claim 15, further comprising:
performing communication between the image forming device and the display apparatus using an NFC method, wherein the image forming device and the display apparatus include an NFC chip.

17. The method of claim 15, wherein the generating the preview image comprises:
adjusting a resolution of the manuscript image to generate the preview image such that a resolution of the preview image is lower than the resolution of the manuscript image.

18. The method of claim 15, wherein the generating the preview image comprises:
changing a data size of the manuscript image to generate the preview image such that a data size of the preview image is lower than the data size of the manuscript image.

19. A non-transitory computer-readable medium to contain computer-readable codes as a program to execute the method of claim 7.

* * * * *